(12) United States Patent
Rou et al.

(10) Patent No.: US 6,855,439 B1
(45) Date of Patent: Feb. 15, 2005

(54) HIGHLY ORIENTED LONGITUDINAL MAGNETIC MEDIA ON DIRECT TEXTURED GLASS SUBSTRATES

(75) Inventors: Shanghsien Alex Rou, Fremont, CA (US); John Wang, Fremont, CA (US); Romulo Ata, San Jose, CA (US); Kueir-Weei Chour, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/662,427

(22) Filed: Sep. 16, 2003

(51) Int. Cl.[7] .............................. G11B 5/66; G11B 5/70
(52) U.S. Cl. ....................... 428/694 TS; 428/694 ST; 428/336; 428/900
(58) Field of Search ....................... 438/694 T, 694 ST, 438/694 SG, 900, 336; 428/694 TS (56) References Cited

U.S. PATENT DOCUMENTS

| | | | |
|---|---|---|---|
| 6,335,103 B1 | 1/2002 | Suzuki et al. | 428/611 |
| 6,395,634 B1 | 5/2002 | Miyamoto | 438/691 |
| 6,410,133 B1 | 6/2002 | Kirino et al. | 428/336 |
| 6,420,647 B1 | 7/2002 | Ji et al. | 136/259 |
| 6,482,505 B1 | 11/2002 | Bertero | 428/212 |
| 6,503,600 B2 | 1/2003 | Watanabe et al. | 428/141 |
| 6,509,083 B2 | 1/2003 | Song et al. | 428/141 |
| 6,524,724 B1 | 2/2003 | Cheng et al. | 428/611 |
| 6,574,060 B2 | 6/2003 | Kanbe et al. | 360/55 |
| 2002/0146594 A1 | 10/2002 | Takahashi et el. | 428/694 TS |
| 2003/0012983 A1 * | 1/2003 | Ataka et al. | 428/694 SG |
| 2003/0049648 A1 | 3/2003 | Akimoto et al. | 435/6 |
| 2003/0059651 A1 | 3/2003 | Shimizu et al. | 428/694 TM |

* cited by examiner

Primary Examiner—Holly Rickman
(74) Attorney, Agent, or Firm—Morrison & Foerster LLP (57) ABSTRACT

Oriented longitudinal magnetic recording media on direct texture glass or glass-ceramic substrate with a film structure of one or more Ni-containing layer, a Cr-containing underlayer, a Co-containing magnetic layer and carbon overcoat exhibits are capable of achieving Mrt OR of >1.5, preferably >1.85. Such highly oriented glass media shows a significant SNR (>2 dB) and parametric improvement over the counterpart isotropic media with the same film structure on non-textured glass or glass-ceramic substrates.

6 Claims, 13 Drawing Sheets

Figure 4: Layer structure to yield optimum Mrt OR

HIGHLY ORIENTED LONGITUDINAL MAGNETIC MEDIA ON DIRECT TEXTURED GLASS SUBSTRATES

FIELD OF THE INVENTION

The present invention relates to the recording, storage and reading of magnetic data, particularly magnetic recording media on textured glass substrates.

BACKGROUND

Magnetic disks and disk drives are conventionally employed for storing data in magnetizable form. Preferably, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk. Data are written onto and read from a rapidly rotating recording disk by means of a magnetic head transducer assembly that flies closely over the surface of the disk. Preferably, each face of each disk will have its own independent head.

Disc drives at their most basic level work on the same mechanical principles as media such as compact discs or even records, however, magnetic disc drives can write and read information much more quickly than compact discs (or records for that matter!). The specific data is placed on a rotating platter and information is then read or written via a head that moves across the platter as it spins. Records do this in an analog fashion where the disc's grooves pick up various vibrations that then translate to audio signals, and compact discs use a laser to pick up and write information optically.

In a magnetic disc drive, however, digital information (expressed as combinations of "0's" and "1's") is written on tiny magnetic bits (which themselves are made up of many even smaller grains). When a bit is written, a magnetic field produced by the disc drive's head orients the bit's magnetization in a particular direction, corresponding to either a 0 or 1. The magnetism in the head in essence "flips" the magnetization in the bit between two stable orientations. In currently produced hard disc drives, longitudinal recording is used. In longitudinal recording, the magnetization in the bits is flipped between lying parallel and anti-parallel to the direction in which the head is moving relative to the disc.

Increasing areal densities within disc drives is no small task. For the past few years, technologists have been increasing areal densities in longitudinal recording at a rate in excess of 100% per year. But it is becoming more challenging to increase areal densities, and this rate is expected to eventually slow until new magnetic recording methods are developed.

To continue pushing areal densities in longitudinal recording and increase overall storage capacity, the data bits must be made smaller and put closer together. However, there are limits to how small the bits may be made. If the bit becomes too small, the magnetic energy holding the bit in place may become so small that thermal energy may cause it to demagnetize over time. This phenomenon is known as superparamagnetism. To avoid superparamagnetic effects, disc media manufacturers have been increasing the coercivity (the "field" required to write a bit) of the disc. However, the fields that can be applied are limited by the magnetic materials from which the head is made, and these limits are being approached.

Newer longitudinal recording methods could allow beyond 140 gigabits per square inch in density. A great challenge however is maintaining a strong signal-to-noise ratio for the bits recorded on the media. When the bit size is reduced, the signal-to-noise ratio is decreased, making the bits more difficult to detect, as well as more difficult to maintain stable recorded information.

Perpendicular recording could enable one to record bits at a higher density than longitudinal recording, because it can produce higher magnetic fields in the recording medium. In perpendicular recording, the magnetization of the disc, instead of lying in the disc's plane as it does in longitudinal recording, stands on end perpendicular to the plane of the disc. The bits are then represented as regions of upward or downward directed magnetization (corresponding to the 1's and 0's of the digital data).

Figure 1:
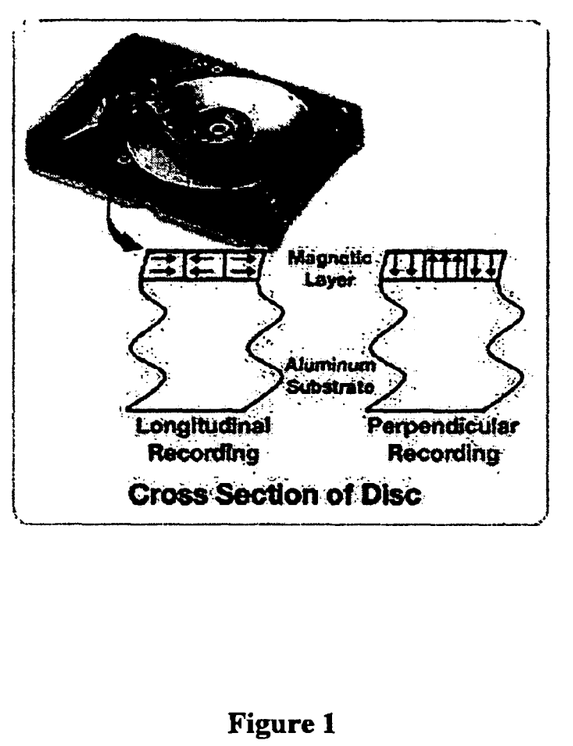
FIG. 1 schematically shows a magnetic disk recording medium comparing longitudinal or perpendicular recording.

A disk recording medium is shown in FIG. 1. Even though FIG. 1 shows one side of the non-magnetic disk, magnetic recording layers are sputter deposited on both sides of the non-magnetic aluminum substrate of FIG. 1. FIG. 1 shows a cross section of a disc showing the difference between longitudinal and perpendicular recording.

Perpendicular recording still has other unsolved problems. On the other hand, longitudinal recording still has room left before reaching the superparamagnetic limit. Thus in recent years, considerable effort has been expended to achieve higher areal recording density using longitudinal recording. Ever increasing hard disk drive areal recording density requires continuously aggressive media signal to noise ratio (SNR) enhancement. One way for creating in a high density magnetic recording with a high signal to noise ratio (SNR) is by enhancing the media Mrt oriented ratio (OR). Media on textured aluminum substrates can achieve Mrt OR higher than 1.8. However, it has been a great challenge to obtain even Mrt OR of about 1.3 on textured glass substrates. This invention provides a solution to satisfy this long-standing need of increasing the Mrt OR of recording media on textured glass substrate beyond about 1.3.

SUMMARY OF THE INVENTION

This invention relates preferably relates to a highly oriented longitudinal magnetic media on direct texture glass substrates. One embodiment is a magnetic recording medium comprising a direct texture glass or glass-ceramic substrate and a film structure directly on the direct texture glass or glass-ceramic substrate, wherein the medium is an oriented longitudinal magnetic recording medium having Mrt OR of 1.5 or more. The medium could have SNR of greater than 2 dB over an isotropic medium with a defined film structure directly on a non-textured glass or glass-ceramic substrate, the defined film structure being identical to the film structure directly on the direct texture glass or glass-ceramic substrate. The film structure could comprise an oxidized NiP layer. The oxidized NiP layer is preferably directly on the direct texture glass or glass-ceramic substrate. The structure could further comprise a NiNb layer between the oxidized NiP layer and the direct texture glass or glass-ceramic substrate. Preferably, the NiNb layer is directly on the direct texture glass or glass-ceramic substrate. Also, the oxidized NiP layer could have a texture resulting substantially from a texture of the texture glass or glass-ceramic substrate and the texture of the oxidized NiP is not a mechanical texture. Preferably, a thickness of the oxidized NiP layer is in the range of about 60–150 Å. Also, the film structure could further comprise a Cr-containing underlayer on the oxidized NiP layer. Preferably, the Mrt OR of the media is 1.5 or more.

Another embodiment is a method for manufacturing a magnetic recording medium comprising introducing a direct texture glass or glass-ceramic substrate into a sputtering chamber and forming a film structure on the direct texture glass or glass-ceramic substrate without removal of the glass or glass-ceramic substrate from the sputtering chamber.

Yet another embodiment is a magnetic recording medium comprising a direct texture glass or glass-ceramic substrate and means for recording data, wherein the medium is an oriented longitudinal magnetic recording medium having Mrt OR of 1.5 or more.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Almost all the manufacturing of the disks takes place in clean rooms, where the amount of dust in the atmosphere is kept very low, and is strictly controlled and monitored. The disk substrates come to the disk fabrication site packed in shipping cassettes. For certain types of media, the disk substrate has a polished nickel-coated surface. The substrates are preferably transferred to process cassettes to be moved from one process to another. Preferably, the cassettes are moved from one room to another on automatic guided vehicles to prevent contamination due to human contact The first step in preparing a disk for recording data is mechanical texturing by applying hard particle slurry to the polished surface of the substrate and to utilize proper tape materials on circumferential motion disk to create circumferentially texture grooves. This substrate treatment helps in depositing of a preferred underlayer crystallographic orientation and subsequently helps preferentially growth of magnetic recording material on the substrate. During the texturing process, small amounts of substrate materials get removed from surface of the disk and remain there. To remove this, the substrate is usually washed. Also, techniques for polishing the surface of the non-magnetic substrate of a recording medium use slurry polishing, which requires wash treatment. Thus, disk substrates are washed after texturing and polishing. However, wash defects could be one of the top yield detractors.

A final cleaning of the substrate is then done using a series of ultrasonic, megasonic and quick dump rinse (QDR) steps. At the end of the final clean, the substrate has an ultra-clean surface and is ready for the deposition of layers of magnetic media on the substrate. Preferably, the deposition is done by sputtering.

Sputtering is perhaps the most important step in the whole process of creating recording media. There are two types of sputtering: pass-by sputtering and static sputtering. In pass-by sputtering, disks are passed inside a vacuum chamber, where they are bombarded with the magnetic and non-magnetic materials that are deposited as one or more layers on the substrate. Static sputtering uses smaller machines, and each disk is picked up and sputtered individually.

The sputtering layers are deposited in what are called bombs, which are loaded onto the sputtering machine. The bombs are vacuum chambers with targets on either side. The substrate is lifted into the bomb and is bombarded with the sputtered material.

Sputtering leads to some particulates formation on the post sputter disks. These particulates need to be removed to ensure that they do not lead to the scratching between the head and substrate. Thus, a lube is preferably applied to the substrate surface as one of the top layers on the substrate.

Once a lube is applied, the substrates move to the buffing/burnishing stage, where the substrate is polished while it preferentially spins around a spindle. After buffing/burnishing, the substrate is wiped and a clean lube is evenly applied on the surface.

Subsequently, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the substrate.

When referring to magnetic recording media, there are two basic types: oriented and isotropic. The differences between the two include the processes and materials used to produce the media. In order for the disc to be capable of storing data, it needs to have a magnetic layer applied to it. Isotropic media has the magnetic layer and under-layers, which are used to control the crystallographic orientation of the magnetic layer, applied to a non preferentially polished substrate.

Oriented media, however, requires two additional steps before applying the under-layers and magnetic layer. The first extra step is the application of a nickel-phosphorus (NiP) layer to the disc substrate by plating or sputtering. The second extra step is texturing of the NiP layer.

The application of the nickel phosphorus layer for oriented media serves two purposes. First, it allows the use of an aluminum substrate, which would otherwise be too soft to be polished to the smooth surface required. Secondly, by applying the nickel phosphorus plating, it becomes possible to texture the disc. The texturing process applies a scratch pattern to the disc surface. The texture process improves magnetic orientation and enhances film performance by initiating grain growth. The scratch pattern causes magnetic properties in down-track and cross-track directions to be different, which greatly increases media signal-to-noise ratio, thereby greatly improving media performance and density.

Isotropic media can be produced on either aluminum or glass media, but is most often produced on glass for mobile and consumer applications where shock tolerance is a necessity. The glass substrate is very stiff and shock tolerant. Although isotropic media does not require extra processing and is somewhat simpler to produce, it still lacks the extra signal-to-noise ratio that oriented media yields. In fact, because the under-layers and magnetic film are added to a polished surface, the recording surface is slightly smoother than the textured surface of oriented media.

Also, because both the surface of the glass and the recording head are so smooth, it becomes increasingly difficult to avoid stiction. Stiction is the result of having two completely smooth surfaces resting against each other with a lubricant in between; they want to stick together. For example, if two pieces of glass were set one on top of the other with some water or lubricant in between, it would be very difficult to pull them apart. The same is true when a recording head lands on a glass substrate during a power-down cycle. When the head attempted to take off, it would not be able to due to stiction. This is what makes it necessary to use ramp load technology.

Ramp load technology employs a lifting mechanism that removes each head from the disc surface prior to power-down and returns the heads to the disc surface only after a sufficient rotation rate has been reached on the next start-up. Since the technology does not employ a traditional landing zone, the head never touches the disc surface and avoids stiction. Without a landing zone, start/stop testing becomes obsolete too. However, ramp load is somewhat inefficient because it uses a sizeable amount of real estate on the disc-at the outer disc radius where lost area really decreases drive capacity.

In short, the isotropic media itself affords a path to continue media manufacturing cost reduction and provide higher shock tolerance, but sacrifices valuable signal-to-noise yields and requires the use of ramp load technology. Thus it is desired to obtain an oriented magnetic media on textured glass to minimize stiction and increase media signal-to-noise ratio.

Although glass substrates can be oriented, the preferred choice is aluminum substrate discs when producing oriented media. When using aluminum, a bias voltage can more easily be applied to the substrate during deposition, which produces better magnetic film structure. Glass substrates are also very difficult to orient. To texture the surface of a glass substrate, seedlayer materials such as a nickel phosphorus layer must be applied, just as with aluminum substrates. However, this layer cannot be applied directly by plating-the lower cost method of applying nickel phosphorus because non-conductive nature of the glass substrate materials; the layer must be applied by sputtering, or in a two-step process involving both sputtering and plating. The second application of nickel phosphorus is more expensive and increases the chances of latent defects.

Despite the high cost of manufacturing a textured glass substrate by applying a NiP layer on glass and then texturing the NiP layer,. The media performance of such textured glass substrates was not capable of achieving high SNR than NiP plated aluminum substrate because the substrate bias is still relative difficult to apply onto such substrate. This poor SNR performance substantially limited the applications of glass media in high areal density and high data rate applications.

This invention overcomes the problems of the high cost of applying a NiP layer on a glass substrate and then texturing the NiP layer by sputtering a NiP layer directly on a textured glass substrate. It was unexpectedly found that the sputtered NiP on the textured glass substrate itself develops a texture resulting at least partially from the texture of the textured glass substrate. One embodiment of the process of this invention allows deposition of subsequent layers on the NiP layer, which could optionally be an oxidized NiP layer, without removing the textured glass substrate from the sputtering chamber after sputtering the NiP layer for to produce mechanical texture on the glass substrate as would be required for an aluminum substrate. "Mechanical texture" means texture caused by removal of material from the surface of a material.

In different embodiments, texture of the textured glass substrate can be induced by the methods of U.S. Pat. Nos. 6,246,543 and 6,294,058, or by the methods disclosed in the U.S. patents disclosed in U.S. Pat. Nos. 6,246,543 and 6,294,058. Note that U.S. Pat. Nos. 6,246,543 and 6,294,058 and the U.S. patents disclosed in U.S. Pat. Nos. 0.6,246,543 and 6,294,058 are incorporated herein by reference. Most of the above methods rely on the use of lithography and etching.

In another embodiment, texture of the textured glass substrate can be induced by an electron-beam (e-beam) to produce patterns on the surface of the glass substrate without the use of lithography and etching. One procedure for producing the e-beam induced patterns is the following.

Prepare amorphous silicon samples through plasma enhanced chemical vapor deposition at 170 degrees Centigrade of amorphous hydrogenated Si on glass substrates until a thickness of 1000 Angstroms is reached. Treat a sample with an e-beam writer operating at 50 keV to create a pattern of 400 by 400 spots with a spot diameter of approximately 0.5 microns. The current could be approximately 1000 nA, with a spot size of about 0.5 microns, and a dosage of about 1,000,000 microCurie/cm2. With the help of an optical microscope to look at reflectance patterns, "texture" could be observed at the spots exposed. By using a pattern-creating program along with an e-beam writer, texture on the glass substrate can be created without the use of lithography and etching. On the textured glass substrate made by e-beam patterning, any metal can be deposited by sputtering to create an oriented media.

Figure 2:
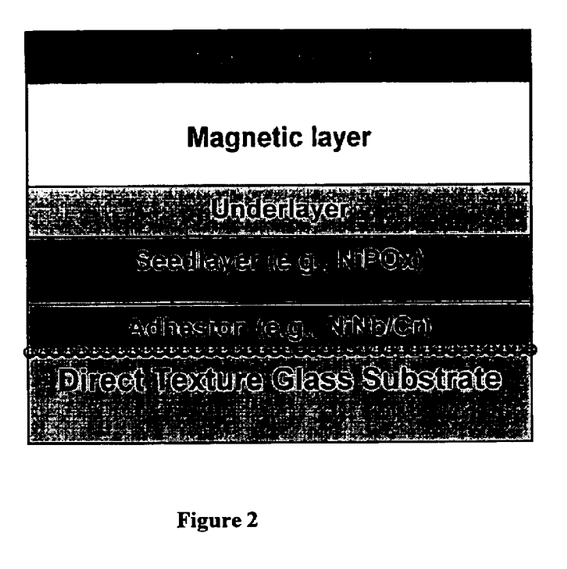
FIG. 2 shows the layer structure of one embodiment of a highly oriented direct texture glass media.

The recording media on direct textured substrate could be fabricated with DC magnetron sputtering except carbon films could be made with ion beam sputtering. FIG. 2 shows the layer structure of recording media on textured glass substrates according to one embodiment of this invention. In accordance with embodiments of this invention, a first Ni-containing layer is deposited on a direct texture substrate, such as a glass or glass-ceramic substrate, as an adhesion layer and a second Ni-containing layer is deposited on the adhesion layer as a seedlayer. The Ni-containing layer could be a, a NiNb layer, a Cr/NiNb layer, a NiP layer or any other Ni-containing layer. The surface of the Ni-containing layer is optionally oxidized. Subsequently, a Cr-containing underlayer is deposited on the seed layer. Then, a Co-containing magnetic layer is deposited on the Cr-containing underlayer. Another embodiment of this invention could include depositing a thin intermediate magnetic layer on the underlayer and depositing the magnetic layer on the intermediate layer.

In a preferred embodiment, the magnetic layer is Co-Cr-Pt-B. In another embodiment, the Co-Cr-Pt-B comprises at least 8–26 atomic percent Cr, 5 to 21 atomic percent Pt, 2 to 18 atomic percent B, and Co in the balance.

In a preferred embodiment, the thickness of the seed layer is about 100 Å to about 2000 Å, the thickness of the underlayer is about 10 Å to about 1000 Å, and the thickness of the magnetic layer is about 100 Å to about 300 Å. In another preferred embodiment, the thickness of the adhesion layer is about 3 Å to about 1000 Å, the thickness of the seed layer is about 40 Å to about 2000 Å, the thickness of the underlayer is about 10 Å to about 1000 Å, and the thickness of the magnetic layer is about 100 Å to about 300 Å.

In a preferred embodiment, the thickness of the adhesion layer is 70 Å to about 250 Å, preferably between 75 Å and 150 Å, and most preferably about 100 Å. In a preferred embodiment, the thickness of the seed layer is 200 Å to about 1600 Å, preferably between 300 Å and 1200 Å, and most preferably about 600 Å. In a preferred embodiment, the thickness of the underlayer is 12 Å to about 500 Å, preferably between 15 Å and 250 Å, and most preferably about 25 Å. In a preferred embodiment, the thickness of the magnetic layer is 150 Å to about 250 Å, preferably between 175 Å and 225 Å, and most preferably about 200 Å. In a preferred embodiment, the thickness of the protective layer is 20 Å to about 300 Å, preferably between 30 Å and 100 Å, and most preferably about 50 Å. The protective layer is made of hydrogenated carbon ($CH_x$).

The magnetic recording medium has a remanent coercivity of about 2000 to about 10,000 Oersted, and an Mrt (product of remanance, Mr, and magnetic layer thickness, t) of about 0.2 to about 2.0 memu/$cm^2$. In a preferred embodiment, the coercivity is about 2500 to about 9000 Oersted, more preferably in the range of about 3000 to about 6000 Oersted, and most preferably in the range of about 3350 to about 5000 Oersted. In a preferred embodiment, the Mrt is about 0.25 to about 1 memu/$cm^2$, more preferably in the range of about 0.3 to about 0.7 memu/$cm^2$, and most preferably in the range of about 0.3 to about 0.6 memu/$cm^2$.

Embodiments of this invention include sputter depositing a Ni-containing layer on a glass or glass-ceramic substrate and oxidizing the surface of the sputter deposited Ni-containing layer at a suitable temperature, e.g., about 100° C. to about 300° C., in an oxidizing atmosphere to form an oxidized Ni-containing layer. Suitable oxidizing atmospheres contain about 1 to about 100 volume percent of oxygen ($O_2$), the remainder an inert gas, such as argon (Ar), e.g., about 20 to about 50 volume percent oxygen, such as about 50 to 80 percent by volume oxygen. The degree of oxidation can be such that the amount of oxygen in the top 5 A to full layer thickness of the oxidized Ni-containing layer, after in situ sputter removal of the 40 Å surface layer, is about 15 atomic percent to about 0–50 atomic percent, such as about 0 atomic percent to about 10 atomic percent.

In embodiments of this invention, the oxidized surface of the Ni-containing layer contains substantially elemental Ni, because preferably Ni is predominately present substantially in its elemental form throughout the Ni-containing layer. On the other hand, the second element of the oxidized Ni-containing layer, if present, is partially (about 75 atomic percent) an oxide and partially in substantially elemental form to a depth of about 0 to 200 Å from the surface.

Embodiments of this invention include deposition of an underlayer, such as Cr or a Cr-alloy underlayer, e.g., CrMo, on the Ni-containing seed layer. An embodiment of this invention also includes depositing a magnetic layer on the Ni-containing seed layer. Another embodiment of this invention includes depositing a thin intermediate magnetic layer on the underlayer and depositing the magnetic layer on the intermediate layer. The intermediate layer comprises a CoCrTa layer, which can comprise about 10 to about 40 atomic percent Cr and about 0 to about 6 atomic percent Ta. Embodiments of this invention include the use of any of the various magnetic alloys containing B, Cr and Co, such as CoCrB, CoCrPtB, CoCrNiB, CoCrNiPtB, CoCrNiTaB, CoCrNiNbB, CoCrPtTaB, CoCrPtNbB and CoCrPtTaNbB, and other combinations of B, Cr, Co, Pt, Ni, Ta and Nb, in the magnetic layer.

Figure 3:
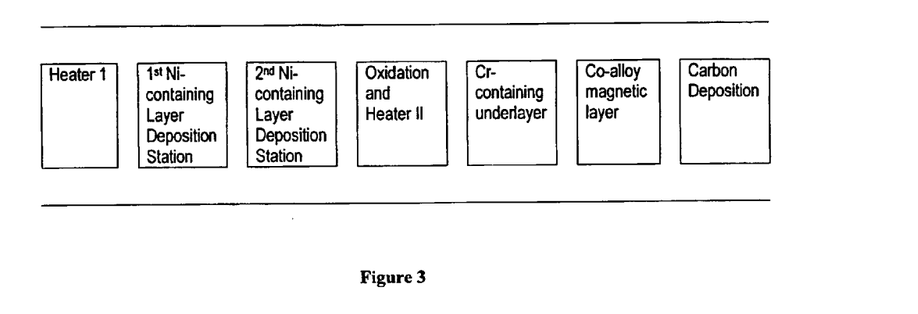
FIG. 3 shows an embodiment of a sputtering system for implementing embodiments of this invention.

An apparatus for manufacturing magnetic recording media in accordance with the embodiments of the present invention is schematically illustrated in FIG. 3. The disk substrates travel sequentially from heater I to a first Ni-containing layer deposition station. Then, the disk substrates travel to a second Ni-containing layer deposition station where the reactive sputter takes place to oxidize the deposited films, and then to the heater station II where surface oxidation of sputtered Ni-containing seedlayer can be oxidized. As a result, the oxidized Ni-containing seed layer is formed on the disk substrates. Subsequent to the deposition of the seed layer, the disk substrates are passed through the Cr-containing underlayer deposition station wherein the Cr-containing underlayer is deposited. Optionally the disk substrates are passed through an intermediate layer deposition station. The disks are then passed to the magnetic layer deposition station and then to the protective carbon overcoat deposition station.

EXAMPLES

In one embodiment, reactive sputtering of NiPOx on textured glass substrates created a chemically suitable surface to promote underlayer Cr growth with [200] perpendicular to the glass substrates. This typically creates a bi-crystal oriented magnetic structure. With the assist of circumferential substrate texture grooves of the direct texture glass substrate, a magnetic film itself was oriented with the c-axis along circumferential direction. This then created a magnetic film with a high Mrt orientation ratio.

For example, the media layer structure of FIG. 2 was capable of achieving Mrt OR of 0.8 to 3 depending on various combinations of seedlayer/underlayer/magnetic layer/processes. This desired highly oriented glass media design and yield a significant SNR (>2 dB) and parametric improvement over the counterpart best isotropic media. The parametric and SNR performance are tabulated in Table 1. To better illustrate the difference in performance, a 2–3 dB increase in SNR would result in doubling the disc density; therefore, this invention has been able to improve disc density of glass media by at least about 40 percent using direct textured glass to create oriented media.

TABLE 1

Parametric performance comparison between isotropic and oriented media on glass substrates.

| Description | Hc | MrT | S* | HF TAA (mV) | LF TAA (mV) | Res | PW50 | OW | SNR | BER |
|---|---|---|---|---|---|---|---|---|---|---|
| Oriented | 4765 | 0.331 | 0.818 | 1.827 | 2.465 | 74.09 | 3.95 | 37.84 | 16.48 | 4.57 |
| Is tropic | 4699 | 0.362 | 0.838 | 0.991 | 1.471 | 67.37 | 3.87 | 40.11 | 14.68 | 3.56 |

The sputter process parameters that were studied so as to produce high Mrt OR media include substrate heating, adhesion and seedlayer materials, adhesion and seedlayer thicknesses, the amount of NiP oxidation, NiPOx layer thickness, NiP oxidation process pressure, and underlayer materials, underlayer thickness, and underlayer processes. The results of these studies are summarized below.

Figure 4:
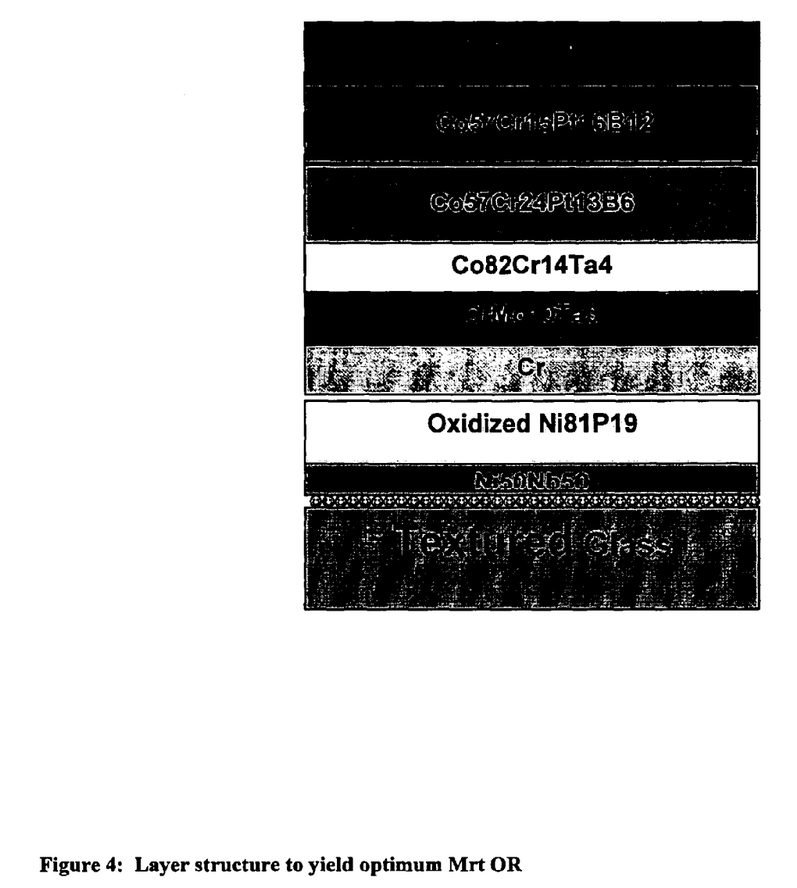
FIG. 4 shows the film structure utilized to generate the data of FIGS. 5–13.

The film structure utilized to generate the following data is shown in FIG. 4. The layer structure containing 1) mechanically texture substrate, 2) adhesion layer Ni50Nb50, 3) oxidized Ni81P19, 4) Cr100, 5)CrMo10Ta3, 6)Co82Cr14Ta4, 7) Co57Cr24Pt13B6, 8)Co58Cr15Pt16B12, 9) CHxNy. The data indicate the optimized process combination are required to achieve the best Mrt orientation.

Figure 5:
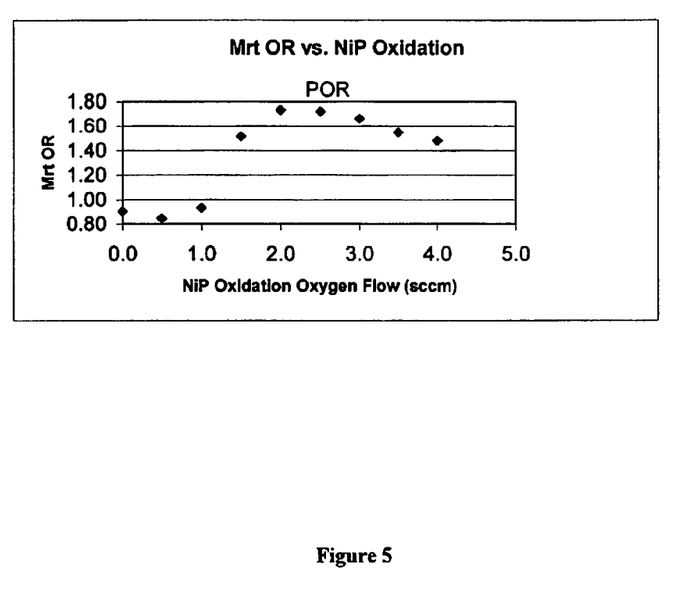
FIG. 5 shows Mrt OR changes with different level of NiP oxidation.

FIG. 5 shows Mrt OR changes with different level of NiP oxidation. Media Mrt OR changes with NiP oxidation processes. The preferred pressure for oxygen in reactive sputtering is between 2 mT–12 mT. Both lower and higher oxidation minimizes the Mrt OR. This result shows oxidation level control surface mobility of the underlayr species. The underlayer species mobility affects the nucleation density and the species ability to move to the desired nucleation site on the substrate surface and subsequently determine the level Mrt OR. Too low mobility species can yield higher nucleation density, however the species will not be able to oriented properly to provide magnetic film to have c-axis preferentially oriented circumferentially. Too high mobility can result in low nucleation density and results in less magnetically induced Mrt OR.

Figure 6:
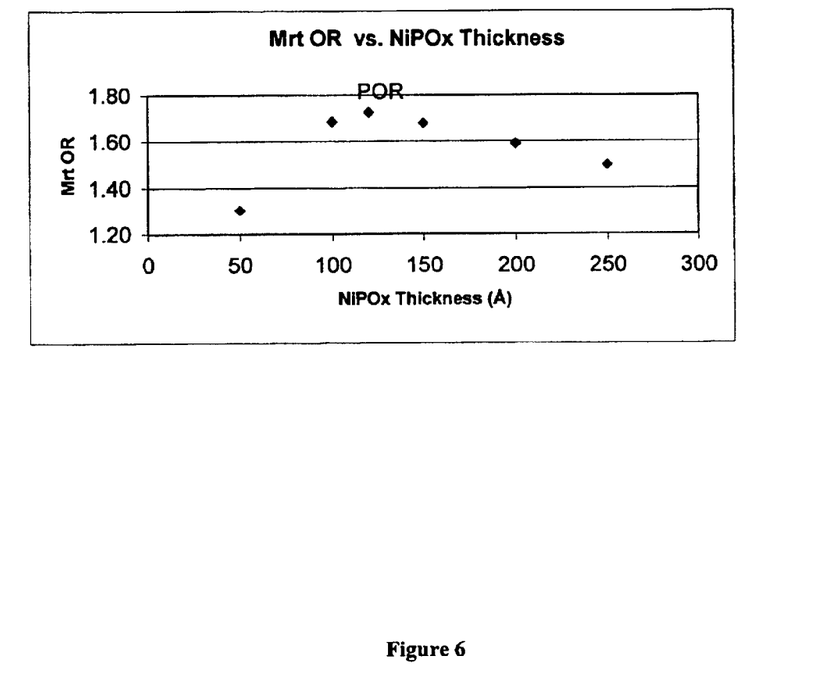
FIG. 6 shows Mrt OR changes with different NiPOx thickness.

FIG. 6 shows Mrt OR changes with different NiPOx thickness. Media Mrt OR changes with NiPOx thickness. The preferred thickness of NiPOx is between 30–150 Å. Higher and lower NiPOx thickness reduces Mrt OR. The results indicate the NiPOx minimum thickness is required to establish desired surface chemistry for proper underlayer orientation and subsequently for preferred circumferential c-axis alignment. However, the preferred underlayer and magnetic nucleation sites for high Mrt OR are eliminated with the increase of the NiPOx thickness.

Figure 7:
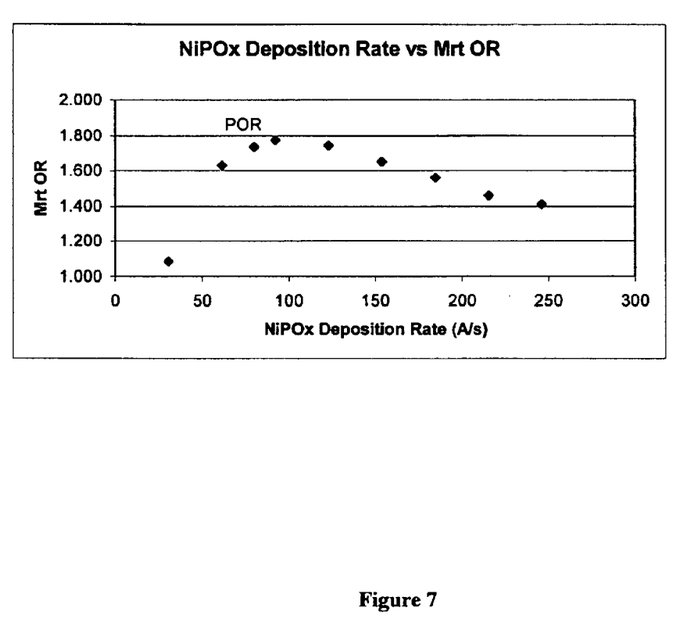
FIG. 7 shows Mrt OR changes with changing NiPOx deposition rate.

FIG. 7 shows Mrt OR changes with changing NiPOx deposition rate. Low NiPOx deposition rate enhances Mrt OR. The deposition rate should be less than 80 A/sec to achieve better Mrt OR. The deposition rate can be translated to the level of seedlayer oxidation. High deposition rate of NiPOx seedlayer results in low level of seedlayer oxidation, hence yields the low Mrt OR. However, the prolong of the deposition can have an adverse effect of low throughput.

Figure 8:
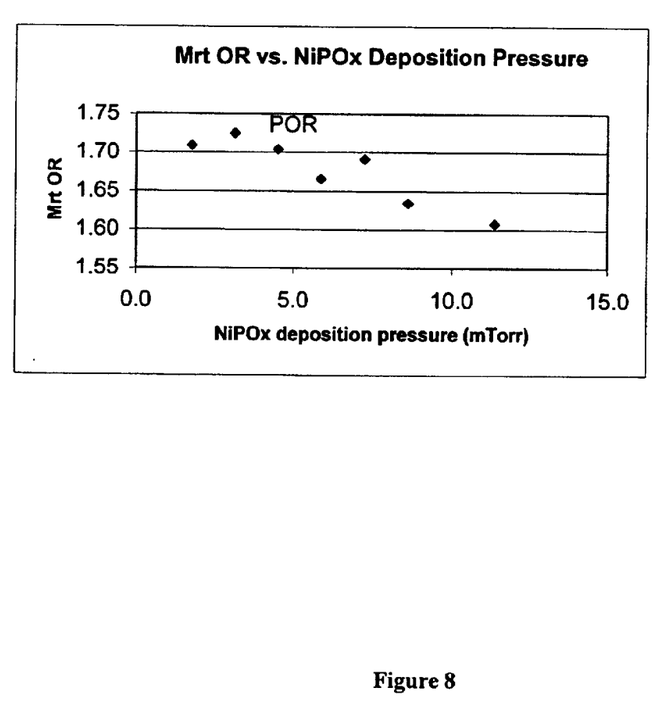
FIG. 8 shows Mrt OR changes with changing NiPOx deposition pressure.

FIG. 8 shows Mrt OR changes with changing NiPOx deposition pressure. The preferred total NiPOx deposition pressure is between 8 mT to 20 mT.

Figure 9:
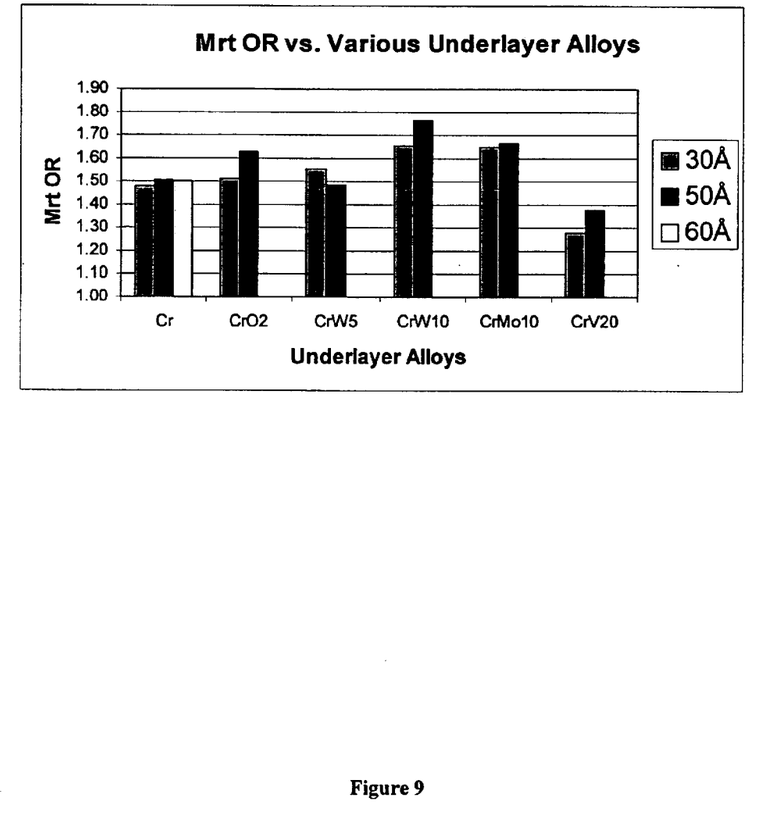
FIG. 9 shows Mrt OR changes with changing underlayer materials.

FIG. 9 shows Mrt OR changes with changing underlayer materials. Different underlayer materials can induce different level of Mrt OR. Different underlayer materials can result in different mobilities and nucleation density on the similarly oxidized seedlayer surface. As described earlier, the optimized mobility can yield highest Mrt OR. The underlayer materials which can achieve high Mrt OR include Cr, CrWx (x=2%–30%), CrMoxTay (x=2%–30%; y=1%-20/%), CrVx (x=2–30%), CrTix (x—2–30%), CrTixBy (x—2–30%; y=2–10%).

Figure 10:
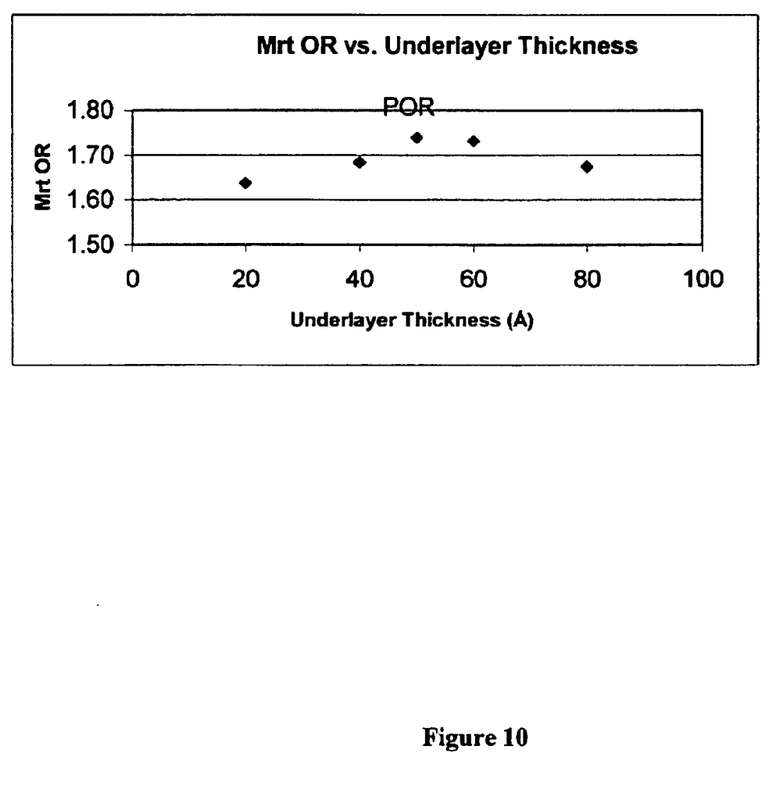
FIG. 10 shows Mrt OR changes with changing underlayer thickness.

FIG. 10 shows Mrt OR changes with changing underlayer thickness. Underlayer material thickness changes Mrt OR. The preferred underlayer thickness to achieve high Mrt OR is between 20 A–150 Å.

Figure 11:
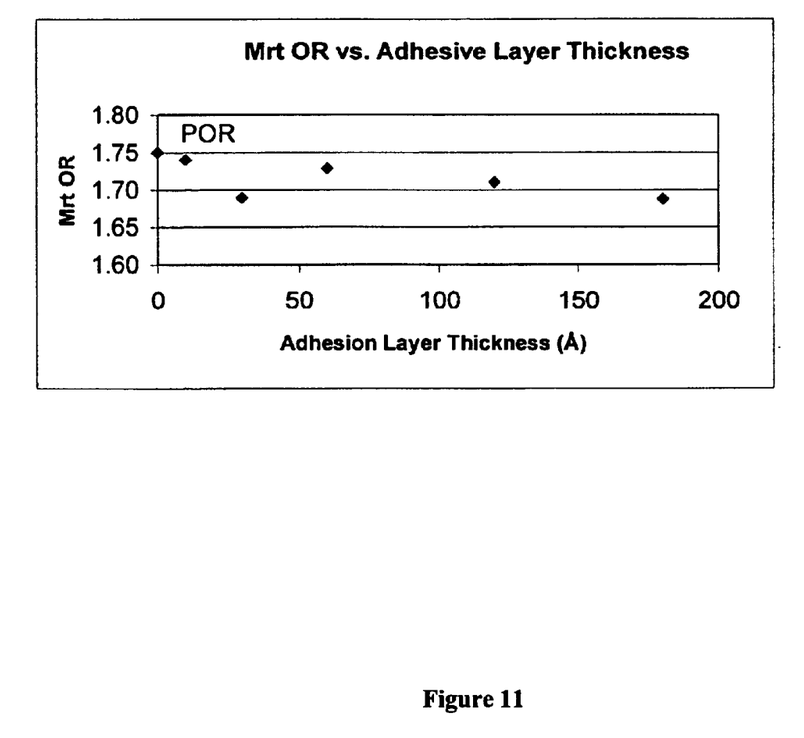
FIG. 11 shows Mrt OR changes with changing adhesion layer thickness.

FIG. 11 shows Mrt OR changes with changing adhesion layer thickness. The preferred nucleation sites are eliminated with the increase of the adhesion layer thickness. Mrt OR improves with decreasing adhesion layer thickness. The preferred adhesion layer thickness range is between 3–60 Å.

Figure 12:
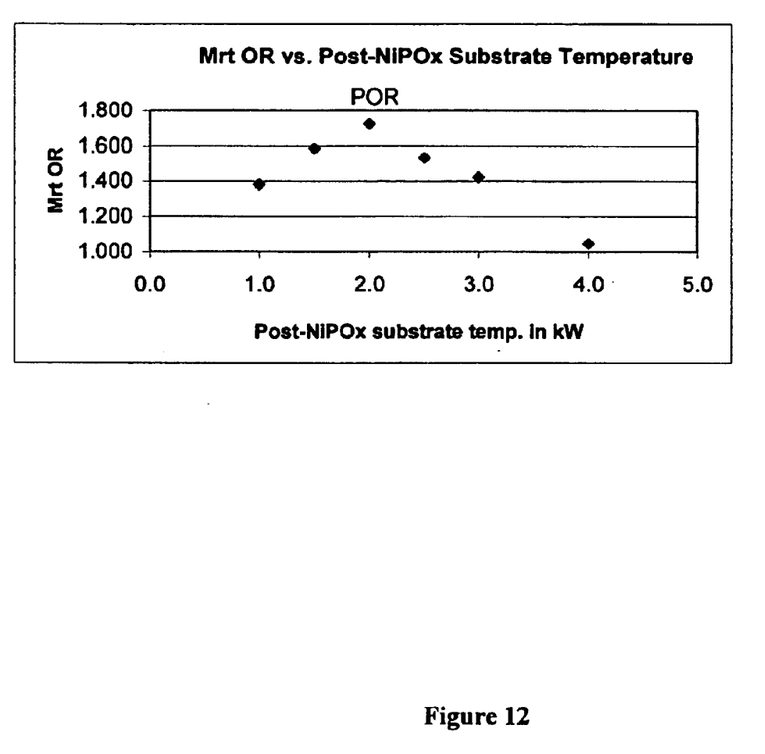
FIG. 12 shows Mrt OR changes with changing post NiPOx substrate temperature.

FIG. 12 shows Mrt OR changes with changing post NiPOx substrate temperature. Lower post-NiPOx substrate temperature enhances Mrt OR Elevated substrate temperature is required for underlayer CrXY deposition to be oriented properly. Note that X and Y are any elements. Optimum post-NiPOx deposition temperature is between 120° C. to 250° C.

Figure 13:
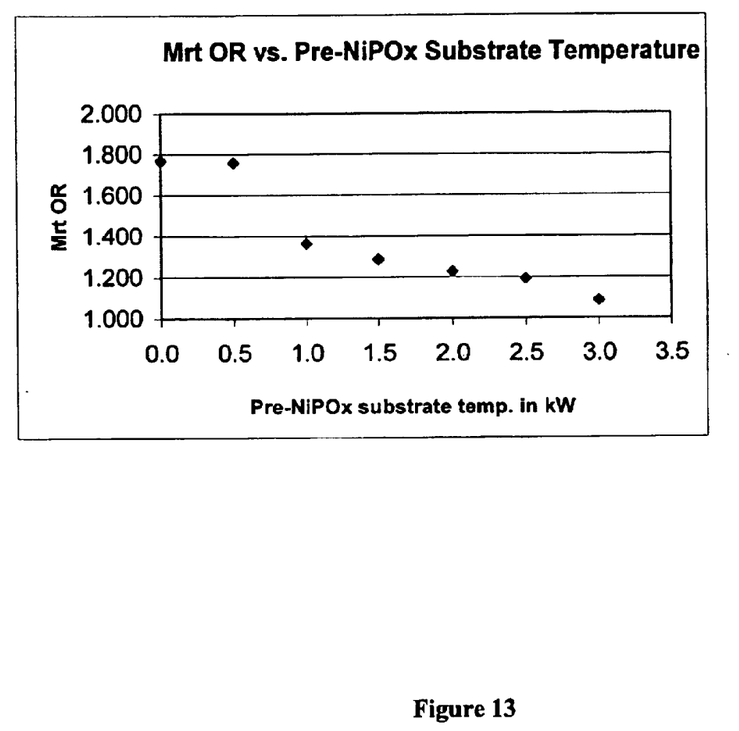
FIG. 13 shows Mrt OR changes with changing pre-NiNb/NiPOx substrate temperature.

FIG. 13 shows Mrt OR changes with changing pre-NiNb/NiPOx substrate temperature. Low pre-NiPOx substrate temperature improves Mrt OR. Ambient temperature deposition of the NiPOx is desired. High temperature deposition of adhesion layer and seedlayer tend to destroy high energy preferred nucleation site. Hence, the Mrt OR decreases.

In addition, it was found that low mobility seedlayer materials can enhance Mrt OR. The materials selected for adhesion layer includes but not limited to NiNb, Cr, CrTax, CrWx, NiAl, RuAl, CoWx, CoMox, TaWx. Note "x" refers to atomic percent. The described embodiments of adhesion, seedlayer and underlayer can be employed for both a simple magnetic structure (e.g., conventional) and a complicated magnetic layer structure (e.g., anti-Ferro magnetic coupling) media design.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A magnetic recording medium comprising a direct texture glass or glass-ceramic substrate and a film structure directly on the direct texture glass or glass-ceramic substrate, wherein the medium is an oriented longitudinal magnetic recording medium having Mrt OR of 1.5 or more and the film structure comprises an oxidized NiP layer, the medium further comprising a NiNb layer between the oxidized NiP layer and the direct texture glass or glass-ceramic substrate.

2. The medium of claim 1, wherein the medium has SNR of greater than 2 dB over an isotropic medium with a defined film structure directly on a non-textured glass or glass-ceramic substrate, the defined film structure being identical to the film structure directly on the direct texture glass or glass-ceramic substrate.

3. The medium of claim 1, wherein the NiNb layer is directly on the direct texture glass or glass-ceramic substrate.

4. The medium of claim 1, wherein the oxidized NiP layer has a texture resulting substantially from a texture of the texture glass or glass-ceramic substrate and the texture of the oxidized NiP is not a mechanical texture.

5. The medium of claim 1, wherein a thickness of the oxidized NiP layer is in the range of about 60–150 Å.

6. The medium of claim 1, wherein the film structure further comprises a Cr-containing underlayer on the oxidized NiP layer.

* * * * *